United States Patent [19]

Ahrens et al.

[11] 4,237,692

[45] Dec. 9, 1980

[54] AIR EJECTOR AUGMENTED COMPRESSED AIR ENERGY STORAGE SYSTEM

[75] Inventors: Frederick W. Ahrens; George T. Kartsounes, both of Naperville, Ill.

[73] Assignee: The United States of America as represented by the United States Department of Energy, Washington, D.C.

[21] Appl. No.: 16,036

[22] Filed: Feb. 28, 1979

[51] Int. Cl.³ ............................ F02C 9/14; F02C 7/00
[52] U.S. Cl. ...................................... 60/659; 60/652; 60/727
[58] Field of Search ............... 60/652, 659, 398, 650, 60/682, 727

[56] References Cited

U.S. PATENT DOCUMENTS

| | | | |
|---|---|---|---|
| 3,677,008 | 7/1972 | Koutz | 60/659 X |
| 3,988,897 | 11/1976 | Strub | 60/652 X |
| 4,147,204 | 4/1979 | Pfenninger | 60/659 X |

*Primary Examiner*—Allen M. Ostrager
*Attorney, Agent, or Firm*—James E. Denny; Richard G. Besha; Frank H. Jackson

[57] ABSTRACT

Energy is stored in slack demand periods by charging a plurality of underground reservoirs with air to the same peak storage pressure, during peak demand periods throttling the air from one storage reservoir into a gas turbine system at a constant inlet pressure until the air pressure in the reservoir falls to said constant inlet pressure, thereupon permitting air in a second reservoir to flow into said gas turbine system while drawing air from the first reservoir through a variable geometry air ejector and adjusting said variable geometry air ejector, said air flow being essentially at the constant inlet pressure of the gas turbine system.

2 Claims, 2 Drawing Figures

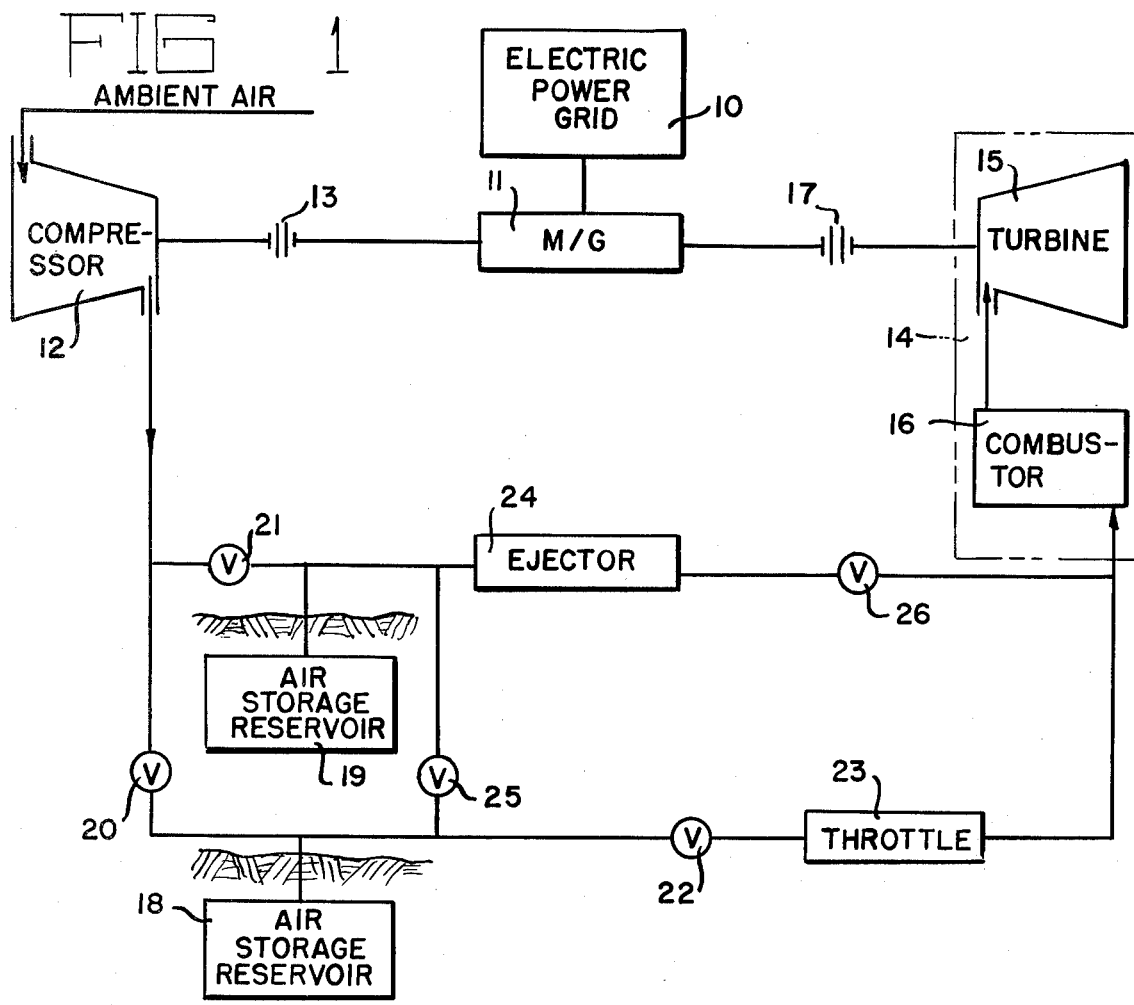
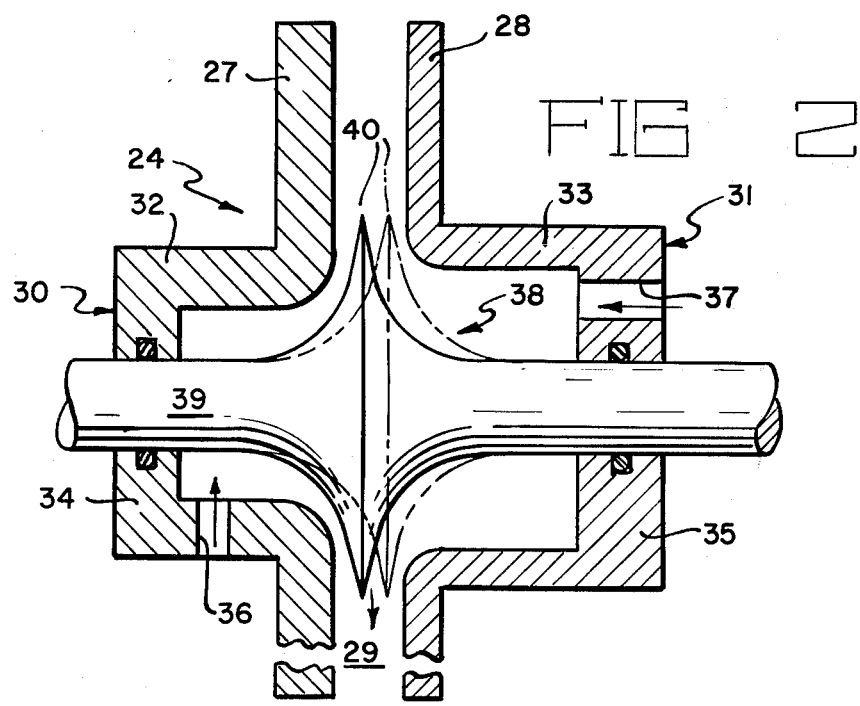

AIR EJECTOR AUGMENTED COMPRESSED AIR ENERGY STORAGE SYSTEM

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a method of utilizing a compressed air energy storage system. In more detail, the invention relates to a method of utilizing a compressed air energy storage system (CAES) employing two or more storage reservoirs. The invention also relates to a compressed air energy storage system in which two or more storage reservoirs are utilized effectively and efficiently.

The electric utility industry has as its main objective the supply of power at the lowest possible cost. This purpose has led to the development of large sophisticated nuclear and fossil-fuel-fired steam generating plants. For both technical and economical reasons, these plants should be operated at a steady load. However, to meet daily and seasonal fluctuations in power demand, the industry uses so-called peaker units. The most common form of these units are gas turbine systems that use premium fuels such as natural gas and oil.

Because of the limited supply of oil and natural gas in this country and current problems in the supply of petroleum fuel from foreign sources, premium fuel has become very expensive and the long-term supply is uncertain. Therefore, electric utilities have been exploring better ways of utilizing, or even eliminating, the use of premium fuels for peaker units and the possibility of operating their large power plants at steady or constant load. These considerations have led to the investigation of energy storage systems.

Studies conducted by electric utilities indicate that CAES power plants are attractive for consideration as an energy storage system. A typical CAES plant can be divided into two basic parts: aboveground power generating equipment and underground air storage reservoir. The aboveground equipment consists of a gas turbine system and air compressors placed on either side of a motor/generator. In contrast to conventional peaker units, the gas turbine system and compressor system are uncoupled; each system operates independently.

The purpose of this arrangement is twofold. Firstly, the compressor system is driven with cheap off-peak power from an electric power grid and the energy is stored as compressed gas in an air storage reservoir. Secondly, during peak hours the compressed air stored in the reservoir is utilized to run the turbines at their full power. This is in contrast to a conventional gas turbine peaker unit wherein the total power output is reduced by one to two thirds. The reason for this reduction in power is because that portion of the system's power is used internally to operate compressors which are needed to supply compressed air to the turbine. By utilizing a CAES system fuel savings on the order of 50% to 60% are possible.

Because of the requirements for storing large amounts of high-pressure compressed air (e.g., $10^7$ to $10^8$ ft$^3$ at 50 atmospheres for a typical 200 MW plant), it is known that underground air reservoirs are an economic necessity.

There are four types of underground reservoirs that are suitable for the storage of compressed air. They are: depleted petroleum fields, aquifers, mined rock cavities, and solution-mined salt cavities. Suitable sitings for CAES systems can be found in many parts of the United States.

The simplest type of air storage reservoir is a fixed-volume underground cavern. This type of reservoir, however, has two drawbacks. First, storage of a large amount of "cushion air" is required because air has to be supplied to the gas turbine system at a constant inlet pressure. Second, a throttling process has to be used in between the cavern and the gas turbine inlet during power generation to provide this constant inlet pressure.

One way to reduce the inefficiency and cost due to throttling might be to operate the turbine system with a variable inlet pressure. Unfortunately, this would result in severe control problems in maintaining the desired output of the gas turbine system. Also it is not certain that the net efficiency would be significantly better since the gas turbine system would be operated at nonideal conditions most of the time. For certain types of caverns the pressure of the air in the cavern can be kept constant by employing an upper water reservoir connected to the cavern with a water compensation leg. While constant pressure storage of this type is applicable for installations in hard rock, it is not suitable for salt cavern reservoirs because of problems of cavern erosion and salt carryover into the upper reservoir.

Regardless of the type, the new reservoir capital cost and associated indirect costs are major expenses in constructing a CAES system. Any significant reduction in reservoir size for equivalent CAES system performance would therefore imply a significant saving in capital costs.

According to the present invention the air in one storage reservoir is throttled down to the constant inlet pressure of a gas turbine system until the pressure in the reservoir drops to the constant inlet pressure of the gas turbine system. The air pressure in a second air storage reservoir is then used in the gas turbine system and, rather than using a throttle, a variable geometry air ejector—that is, an air ejector in which total flow rate and entrainment ratio can be varied—is used to draw air out of the first air storage reservoir, the constant inlet pressure of the gas turbine system being maintained by adjustment of the variable geometry air ejector. More efficient utilization of the total air supply in the air storage sytem is thereby attained.

BRIEF DESCRIPTION OF THE DRAWINGS

FIG. 1 is a block diagram of a compressed air energy storage system according to the present invention and FIG. 2 is a sketch of a variable geometry air ejector used therein.

DESCRIPTION OF THE PREFERRED EMBODIMENT

As shown in FIG. 1, an electric power grid 10 provides energy to operate motor/generator 11 as a motor during off-peak hours and receives energy from motor/generator 11, operated as a generator, during peak demand hours. Motor/generator 11 is connected to a compressor 12 by a disconnectable coupling 13 and to a gas turbine system 14, which includes a gas turbine 15 and a combustor 16, by a disconnectable coupling 17. The outlet of compressor 12 is connected to first and second underground air storage reservoirs 18 and 19 respectively through valves 20 and 21 respectively and first underground air storage reservoir 18 is connected to combustor 16 of gas turbine system 14 by an on-off valve 22 and a throttle valve 23. Second underground air storage reservoir 19 is connected to the primary inlet of a variable geometry air ejector 24, the secondary inlet thereof being connected to first underground air storage reservoir 18 by a valve 25, and the outlet thereof being connected to combustor 16 of gas turbine system 14 by valve 26.

During off-peak hours, with valves 22, 25 and 26 closed and valves 20 and 21 open, motor/generator 11, operating as a motor on power from grid 10, operates compressor 12 which charges both air storage reservoirs 18 and 19 to the same peak storage pressure. During peak demand hours, motor/generator 11 is disconnected from compressor 12 and connected to turbine 15 of gas turbine system 14. With valves 20, 21, 25 and 26 closed and valve 22 open, air from underground air storage reservoir 18 is fed to gas turbine system 14 through throttle 23 at the preferred constant inlet pressure of the gas turbine system. When the pressure in underground air storage reservoir 18 falls to this constant inlet pressure of the gas turbine system, valve 22 is closed and valves 25 and 26 are opened. Air from second underground air storage reservoir 19 is thereupon fed into gas turbine system 14 through variable geometry air ejector 24 which draws additional air from the first underground air storage reservoir 18. As the pressure drops in both underground air storage reservoirs 18 and 19, the orifice size in variable geometry air ejector 24 is increased to obtain a relatively uniform flow rate of air through the ejector. The entrainment ratio—ratio of primary air flow to secondary air flow—is simultaneously adjusted to obtain an air stream at approximately the desired gas turbine system constant inlet pressure. While these adjustments could be accomplished manually, design of an automatic system employing conventional components would be well within the skill of the art.

FIG. 2 is a sketch of one particular variable geometry air ejector which can be used in practicing this invention. At least two degrees of freedom are required in control of the geometry of the nozzle: one controlling the ratio of primary to secondary air and the other controlling the total flow. It will be appreciated that details of the variable geometry air ejector are not critical insofar as this invention is concerned and other configurations than that next to be described could be used. It is essential, however, that a variable geometry air ejector be used to attain the benefits of the present invention rather than a fixed geometry ejector.

Air ejector 24 consists of a pair of parallel annular diffuser plates 27 and 28 defining therebetween an outlet orifice 29. At least one of the diffuser plates is movable toward and away from the other to adjust the width of the outlet orifice. Extending out from diffuser plates 27 and 28 and immediately surrounding openings therein are inlet nozzles 30 and 31 which consists of cylindrical portions 32 and 33 and end caps 34 and 35. Cylindrical portion 32 of inlet nozzle 30 contains primary inlet opening 36 and end cap 35 of inlet nozzle 31 contains secondary inlet opening 37. Cylindrical portion 33 of inlet nozzle 31 is of greater diameter than is cylindrical portion 32 of inlet nozzle 30.

The device includes a valve stem 38 consisting of a shaft 39 which pierces end caps 34 and 35 in a sliding fit and a disc 40 at approximately the midpoint thereof wherein the shaft flares uniformly and symmetrically from both ends of the shaft to form the disc, the disc extending out from the shaft into the outlet aperture 29.

It is thus readily apparent that longitudinal movement of shaft 39 will change the position of disc 40 within aperture 29 and thus change the relative size of the opening between the primary inlet nozzle 30 and the disc 40 and that of the opening between the secondary inlet nozzle 31 and disc 40. This movement of shaft 39 will change the entrainment ratio of primary air flow to secondary air flow and movement of one of diffuser plates 30 with respect to the other will change the total flow rate through the ejector.

While improved results may be attainable using a fixed geometry air ejector, it is only with a variable geometry air ejector that the improvement becomes economically significant. A fixed geometry air ejector can only be designed to operate at maximum level of efficiency over a very short range of operating pressures. Since the pressure in the air storage reservoirs falls continuously as the system is operated, efficiency of the system will be at its maximum for only a short period of time. In addition, it would be necessary to employ a throttle with a fixed geometry air ejector since there would otherwise be no way of maintaining a constant gas turbine system input pressure.

In contrast, a variable geometry air ejector can be continuously adjusted as the pressure in the primary and secondary air storage reservoirs decreases at a different rate to maintain a constant flow rate of air at the constant gas turbine system input pressure. Referring again to the drawing, as the air storage reservoir 19 is depleted, the pressure therein decreases and so does the pressure in air storage reservoir 18 but at a different rate. Since the air pressure is decreasing, the ejector must be "opened up" to maintain a constant flow rate. This is accomplished by moving one of diffuser plates 27 or 28 away from the other to open the outlet aperture 29. Since the output pressure of the ejector is a function of the pressure in both air storage reservoirs and the pressure in these reservoirs is decreasing at a different rate, the entrainment ratio must be varied to maintain the desired constant gas turbine system inlet pressure. This is accomplished by moving shaft 39 of valve stem 38 longitudinally. Since the pressure of air delivered to gas turbine system 14 can be maintained constant by adjustments within air ejector 24, no separate throttle is needed.

Calculations based on a supersonic mixing model which includes the losses due to fluid friction and heat transport during the ejector mixing process indicate substantial gains in air flow even with modest ejector efficiencies. For example

| Ejector efficiency | 1% | 10% | 20% |
|---|---|---|---|
| Air flow increase | 5% | 15% | 20% |

For new power plants, these gains translate into smaller underground caverns which are the largest cost items in CAES power plants. A second benefit is reduced pumping costs to replenish the reservoirs.

In an existing CAES system, air is stored in two underground caverns at 1000 psi. During peak power demand, the air is throttled to 650 psi and supplied to a gas turbine system for power production.

An air ejector-augmented air storage system can also be utilized which contains more than two separate air storage reservoirs. Although not shown in the figures, all of the air storage reservoirs are initially filled with the same volume of compressed air. During operation, compressed air is initially delivered to the gas turbine system from one of the air storage reservoirs via a throttling process. After the pressure in the first air storage reservoir falls to the constant inlet pressure of the gas turbine system, the compressed air from a second air storage reservoir is used as the driving (primary) stream for an air ejector and more compressed air is entrained from the first air storage reservoir. After the pressure in the second air storage reservoir reaches the constant inlet pressure, the air from a third is used as the driving stream to pump more compressed air from the second. The pattern is repeated until the pressure in the last air storage reservoir approches the constant inlet pressure of the gas turbine system. At the end of the process, the air pressure in all but the last cavern would be lower than the constant inlet pressure.

As the number of air storage reservoirs increase, the compression work required to recharge the caverns decreases at a decreasing rate, and the total amount of entrained air increases at a decreasing rate. The maximum savings by using an infinite number of air storage reservoirs as opposed to only two is twice the savings yielded by the use of two reservoirs. However, since the incremental benefit of each additional air storage reservoir is less than the previous one, economics dictates that only a small number of air storage reservoirs be used.

The embodiments of the invention in which an exclusive property or privilege is claimed are defined as follows:

1. A method of storing energy during slack demand periods and utilizing said energy in peak demand periods comprising utilizing excess power available during slack demand periods to charge a plurality of underground reservoirs with air to the same peak storage pressure, during peak demand periods throttling the air from one storage reservoir into a gas turbine system at a constant inlet pressure until the air pressure in the reservoir falls to said constant inlet pressure, thereupon permitting air in a second reservoir to flow into said gas turbine system while drawing air from the first reservoir through a variable geometry air ejector and adjusting said variable geometry air ejector, said air flow being essentially at the constant inlet pressure of the gas turbine system.

2. A compressed air energy storage system for use with a gas turbine system operated at a constant inlet pressure comprising a plurality of underground reservoirs, means for charging the reservoirs to the same peak pressure, means for supplying the gas turbine system with air from one of the reservoirs at said constant inlet pressure, means for supplying the gas turbine system with air from a second reservoir when the air pressure of the first reservoir has dropped to said constant inlet pressure including a variable geometry air ejector having a primary inlet connected to the second reservoir and a secondary inlet connected to the first reservoir whereby the pressure in the first cavern is drawn down below said constant inlet pressure, said variable geometry air ejector including therein means for adjusting the total flow rate, the output pressure and the entrainment ratio, whereby flow from the second cavern may be maintained at approximately the constant inlet pressure without a separate throttle.

* * * * *